United States Patent
Huang et al.

(10) Patent No.: US 12,447,145 B2
(45) Date of Patent: Oct. 21, 2025

(54) COMPOSITIONS AND METHODS FOR TREATING INFLAMMATORY NEUROLOGICAL DISORDERS

(71) Applicant: Georgetown University, Washington, DC (US)

(72) Inventors: Jeffrey Huang, Bethesda, MD (US); Maryna Baydyuk, Springfield, VA (US)

(73) Assignee: Georgetown University, Washington, DC (US)

( * ) Notice: Subject to any disclaimer, the term of this patent is extended or adjusted under 35 U.S.C. 154(b) by 1185 days.

(21) Appl. No.: 17/281,659

(22) PCT Filed: Oct. 2, 2019

(86) PCT No.: PCT/US2019/054245
§ 371 (c)(1),
(2) Date: Mar. 31, 2021

(87) PCT Pub. No.: WO2020/072608
PCT Pub. Date: Apr. 9, 2020

(65) Prior Publication Data
US 2022/0000842 A1    Jan. 6, 2022

Related U.S. Application Data

(60) Provisional application No. 62/740,175, filed on Oct. 2, 2018.

(51) Int. Cl.
*A61K 31/423* (2006.01)
*A61K 9/00* (2006.01)

(52) U.S. Cl.
CPC .......... *A61K 31/423* (2013.01); *A61K 9/0019* (2013.01)

(58) Field of Classification Search
None
See application file for complete search history.

(56) References Cited

U.S. PATENT DOCUMENTS

2015/0336876 A1  11/2015  Kanai et al.
2016/0120830 A1   5/2016  Heresco-Levy

FOREIGN PATENT DOCUMENTS

JP      2017-155023 A    9/2017

OTHER PUBLICATIONS

Wikipedia âExperimental autoimmune encephalomyelitisa <https://en.wikipedia.org/wiki/Experimental_autoimmune_encephalomyelitis> captured via Wayback MachineÃ® Mar. 5, 2018 (Year: 2018).*
Michael F. Wempe, et al., "Metabolism and Pharmacokinetic Studies of JPH203, an L-Amino Acid Transporter 1 (LAT1) Selective Compound," Drug Metabolism and Pharmacokinetics, Sep. 13, 2011, pp. 155-161, vol. 27, No. 1.
Koji Oda, et al., "L-Type Amino Acid Transporter 1 Inhibitors Inhibit Tumor Cell Growth," Cancer Science, Dec. 9, 2009, pp. 173-179, vol. 101, No. 1.
Palanivel Kandasamy, et al., "Amino Acid Transporters Revisited: New Views in Health and Disease," Trends in Biochemical Sciences, Oct. 2018, pp. 752-789, vol. 43, No. 10.
Keitaro Hayashi, et al., "LAT1 is a Critical Transporter of Essential Amino Acids for Immune Reactions in Activated Human T Cells," The Journal of Immunology, Sep. 13, 2013, pp. 4080-4085, vol. 191, No. 8.
International Search Report and Written Opinion of the International Searching Authority in International Application No. PCT/US2019/054245, dated Jan. 6, 2020.
Ren et al., Amino-Acid Transporters in T-Cell Activation and Differentiation, Cell Death and Disease, Mar. 2, 2017, e2655, vol. 8.
Huttunen et al., A Selective and Slowly Reversible Inhibitor of L-Type Amino Acid Transporter 1 (LAT1) Potentiates Antiproliferative Drug Efficacy in Cancer Cells, Journal of Medicinal Chemistry, Jun. 2, 2016, pp. 5740-5751, vol. 59.
Natesh Singh, et al., "Discovery of Potent Inhibitors for the Large Neutral Amino Acid Transporter 1 (LAT1) by Structure-Based Methods", International Journal of Molecular Sciences, 2019, p. 27, vol. 20, No. 1.
Magdalena Markowicz-Piasecka, et al., "Hemocompatible LAT1-Inhibitor Can Induce Apoptosis in Cancer Cells without Affecting Brain Amino Acid Homeostasis", Apoptosis, 2020, pp. 426-440, vol. 25, Nos. 5-6.
Cris S. Constantinescu, et al., "Experimental Autoimmune Encephalomyelitis (EAE) as a Model for Multiple Sclerosis (MS)", British Journal of Pharmacology, 2011, pp. 1079-1106, vol. 164, No. 4.
Ryan J. Bevan, et al., "Meningeal Inflammation and Cortical Demyelination in Acute Multiple Sclerosis", Annals of Neurology, 2018, pp. 829-842, vol. 74, No. 6.
Roberta Magliozzi, et al., "Meningeal B-cell Follicles in Secondary Progressive Mutiple Sclerosis Associate with Early Onset of Disease and Severe Cortical Pathology", Brain, 2007, pp. 1089-1104, vol. 130, part 4.
Roberta Magliozzi, et al., "A Gradient of Neuronal Loss and Meningeal Inflammation in Multiple Sclerosis", Annals of Neurology, 2010, pp. 477-493, vol. 68, No. 4.
Yvonne Dombrowski, et al., "Regulatory T Cells Promote Myelin Regeneration in the Central Nervous System", Nature Neuroscience, 2017, pp. 674-680, vol. 20, No. 5.

(Continued)

*Primary Examiner* — Adam C Milligan
*Assistant Examiner* — Jed A Kucharczk
(74) *Attorney, Agent, or Firm* — Grimes & Yvon LLP

(57) ABSTRACT

The present application is directed to methods and compositions for treating a condition marked by enhanced inflammation in the central nervous system (CNS). The methods comprise administering to a subject in need of treatment of enhanced inflammation in the CNS an inhibitor of an amino acid transporter in inflammatory cells present in the CNS. The compositions of the present invention relate to compositions comprising an inhibitor of an amino acid transporter in inflammatory cells, or a pharmaceutically acceptable salt thereof, wherein the composition is formulated for direct administration into the CNS of a mammal.

12 Claims, 3 Drawing Sheets

(56) References Cited

OTHER PUBLICATIONS

Andrea Pennati, et al., "Regulatory B Cells Normalize CNS Myeloid Cell Content in a Mouse Model of Multiple Sclerosis and Promote Oligodendrogenesis and Remyelination", Journal of Neuroscience, 2020, pp. 5105-5115, vol. 40, No. 26.
Natesh Singh, et al., "Discovery of Potent Inhibitors for the Large Neutral Amino Acid . . . ", International Journal of Molecular Sciences, 2019, p. 27, vol. 20, No. 1.
Magdalena Markowicz-Piasecka, et al., "Hemocompatible LAT1-Inhibitor Can Induce Apoptosis in Cancer Cells without . . . ", Apoptosis, 2020, pp. 426-440, vol. 25, Nos. 5-6.
Cris S. Constantinescu, et al., "Experimental Autoimmune Encephalomyelitis (EAE) as a Model . . . ", British Journal of Pharmacology, 2011, pp. 1079-1106, vol. 164, No. 4.
Roberta Magliozzi, et al., "Meningeal B-cell Follicles in Secondary Progressive Mutiple Sclerosis Associate with Early . . . ", Brain, 2007, pp. 1089-1104, vol. 130, part 4.
Andrea Pennati, et al., "Regulatory B Cells Normalize CNS Myeloid Cell Content in a Mouse Model of . . . ", Journal of Neuroscience, 2020, pp. 5105-5115, vol. 40, No. 26.

* cited by examiner

COMPOSITIONS AND METHODS FOR TREATING INFLAMMATORY NEUROLOGICAL DISORDERS

CROSS-REFERENCE TO RELATED APPLICATION

This application is a National Stage of International Application No. PCT/US2019/054245, filed on Oct. 2, 2019, which claims the benefit of priority to U.S. Provisional Application No. 62/740,175, filed on Oct. 2, 2018, each of which is herein incorporated by reference in its entirety for all purposes.

STATEMENT REGARDING FEDERALLY SPONSORED RESEARCH OR DEVELOPMENT

This invention was made with government support under NS091890 and NS107523 awarded by the National Institutes of Health. The government has certain rights in the invention.

BACKGROUND OF THE INVENTION

Field of the Invention

The present application is directed to methods and compositions for treating a condition marked by enhanced inflammation in the central nervous system (CNS). The methods and compositions relate to the use of inhibitors of an amino acid transporter in inflammatory cells present in the CNS.

Background of the Invention

Multiple sclerosis (MS) is a chronic inflammatory disorder of the CNS that is characterized by demyelination, axonal injury, and progressive neurodegeneration. Intriguingly, in the early stage of the disease, oligodendrocytes can regenerate spontaneously and restore myelin after injury. This process, called "remyelination," is possible because oligodendrocyte precursor cells (OPCs), which are abundant and widely distributed in the adult CNS, are able to migrate to areas of damage, differentiate into oligodendrocytes, and regenerate myelin around previously demyelinated axons. In advanced stages of the disease, however, remyelination becomes increasingly inefficient and ultimately fails. The failure to regenerate myelin leads to impaired axonal function and progressive neurodegeneration, resulting in the accumulation of irreversible disability in patients.

Current immunomodulatory therapies that target peripheral immune cell infiltration into the CNS can be effective in reducing relapses and disease severity in the relapsing-remitting form of the disease. These therapies, however, are largely ineffective in the progressive form of the disease, in which CNS inflammation appears to be "trapped" inside the brain compartment behind a closed blood brain barrier. Indeed, there are distinct differences in inflammation occurring in the CNS compared to inflammation in the periphery. For example, CNS inflammation involves activation of microglia/macrophages and T cell lymphocytes, whereas peripheral inflammation involves activation of circulating monocyte/macrophages and lymphocytes.

In progressive forms of MC, such as primary progressive MS (PPMS) and secondary progressive MS (SPMS), smoldering inflammation, characterized by the slow expansion of lesions through microglia/macrophage activation, contributes to disease progression. Indeed, analyses of postmortem brain sections from progressive MS patients reveal slowly expanding plaques exhibiting high-grade inflammation, active demyelination, incomplete remyelination, and profound axonal loss. Exactly why remyelination fails in the progressive phase of MS remains poorly understood. There are several possibilities for why remyelination might become impaired in MS, including advanced age, uncontrolled inflammation, inefficient cellular/myelin debris clearance, axonal dystrophy, or inability for OPCs to differentiate.

Several previous studies have demonstrated that CNS inflammation, i.e., through microglia/macrophage activation, plays a critical role in remyelination success. For example, macrophage depletion through the injection of clodronate-liposomes or minocycline to mouse models of demyelination severely inhibits remyelination by preventing oligodendrocyte lineage cell progression in lesions. Moreover, induction of inflammation in chronically demyelinated axons triggers OPC differentiation and remyelination. Paradoxically, inflammation has also been implicated in remyelination failure. In particular, high grade or chronic inflammation has frequently been observed in progressive MS lesions that display deficient mature oligodendrocytes and remyelination. Moreover, transplantation of lymphocytes from MS patients into demyelinated mouse CNS has been shown to enhance microglia/macrophage activation, resulting in OPC proliferation, but a failure to differentiate into oligodendrocytes for remyelination. Indeed, chronic MS lesions display an abundance of OPCs that were recruited to the lesion in response to demyelinating injury, but were likely unable to differentiate into remyelinating oligodendrocytes under an unresolved inflammatory environment. Collectively, these studies suggest that, despite the beneficial effect of inflammation in mobilizing OPC recruitment to and proliferation in lesions, inflammation must eventually be resolved to ensure efficient oligodendrocyte lineage cell progression and remyelination.

SUMMARY OF THE INVENTION

The present application is directed to methods and compositions for treating a condition marked by enhanced inflammation in the CNS. The methods comprise administering to a subject in need of treatment of enhanced inflammation in the CNS an inhibitor of an amino acid transporter in inflammatory cells present in the CNS.

The present application is also directed to compositions comprising an inhibitor of an amino acid transporter in pro-inflammatory cells, or a pharmaceutically acceptable salt thereof, wherein the composition is formulated for direct administration into the CNS of a mammal.

DETAILED DESCRIPTION OF THE INVENTION

Figure 1:
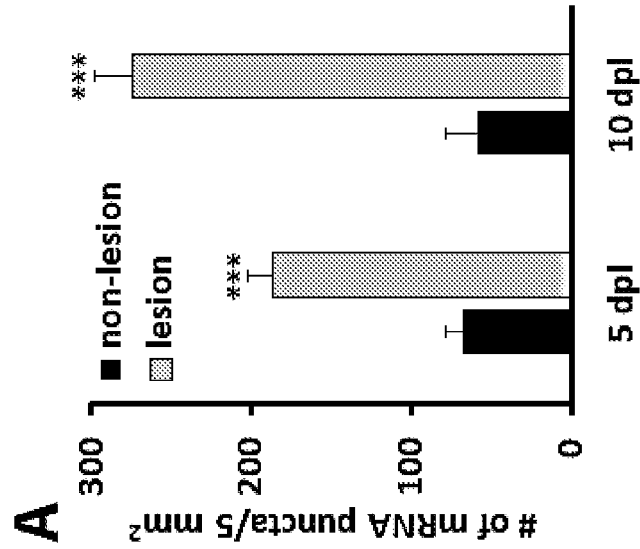
FIG. 1 depicts expression of Slc7a5 in immune cells in the CNS lesion.
Figure 1:
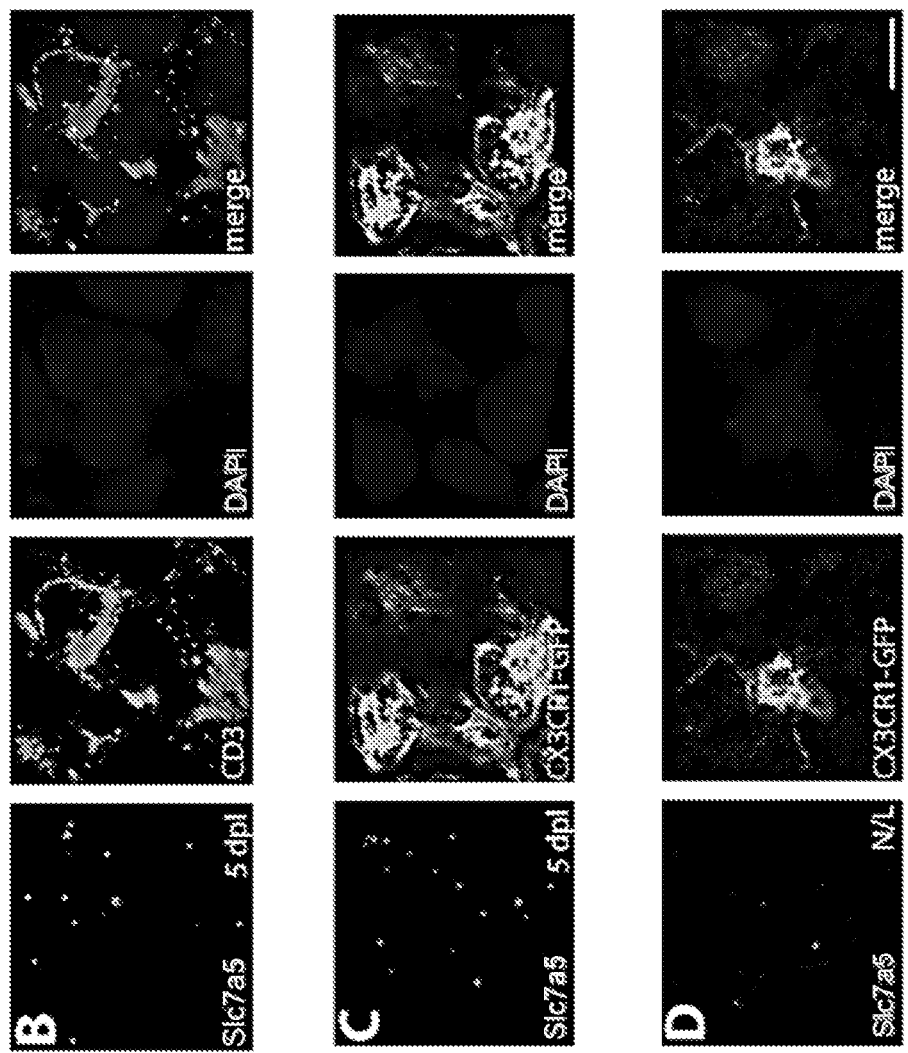

Enhanced inflammation, often referred to in the art as "unresolved inflammation," is an imbalance between the two opposing pathways of acute inflammation, i.e., anti-inflammatory and pro-inflammatory pathways, resulting in disruption of the overall protective nature of the immune system. The terms "enhanced inflammation" and "unresolved inflammation" are used interchangeably herein. Persistent unresolved inflammation can lead to chronic inflammation, which, in turn can lead to complications or disease states. One of skill in the art will readily understand the terms unresolved inflammation or enhanced inflammation as used herein.

Inflammation, however, may take on different forms, depending on the location of the anti-inflammatory and pro-inflammatory responses. Thus, unresolved inflammation and chronic inflammation may also take on different forms depending on the site of inflammation. For example, inflammation within the CNS involves microglia, which are distinct immune cells found only in the CNS. On the other hand, inflammation outside of the CNS cannot involve microglia since microglia are found only in the CNS.

Microglia are the "resident immune cells" of the CNS and not found outside of the CNS. Microglia are phenotypically and functionally different than other types of immune cells outside of the CNS. For example, microglia normally do not express or have low-level expression of mRNA transcripts that are typically expressed in other macrophage populations outside of the CNS. Microglia, however, normally display unusually high-expression levels of mRNA for genes related to oxidative metabolism. See Perry, V. and Teeling, J., *Semin. Immunopathol.*, 35(5): 601-612 (2013), which is incorporated by reference.

The role of microglia in CNS inflammation is not well understood and there is conflicting data on the beneficial or deleterious effects of microglia during CNS inflammation. For example, Yin, J, et al., *J. Immunology Res., Vol.* 2017, Article ID 5150678, (doi: 10.1155/2017/5150678) reports in a recent review article that activated microglia may provide neuroprotective effects during MS. See, Bogie, F., et al., *Acta Neuro-Pathologica*, 128(2): 191-213 (2014). On the other hand, activated microglia could also have a neurotoxic effect during MS progression. At this point, it remains unclear if inhibiting the activity of microglia would provide therapeutic relief in patients suffering from inflammation within the CNS, or if promoting the proliferation and/or activation of microglia would provide therapeutic relief in patients suffering from inflammation within the CNS.

The present application is directed to methods and compositions for treating a condition (therapeutic methods) marked by enhanced inflammation in the CNS. The therapeutic methods comprise administering to a subject in need of treatment of enhanced inflammation in the CNS an inhibitor of an amino acid transporter in inflammatory cells present in the CNS. In one specific embodiment, the therapeutic methods comprise administering to a subject in need of treatment of enhanced inflammation in the CNS an inhibitor of an amino acid transporter in microglial cells.

In one embodiment, the condition marked by enhanced inflammation in the CNS is marked by demyelination of neurons in either white matter or gray matter of the CNS. The process of demyelination is well-known in the art and is a pathology associated with the degradation, damage or loss of integrity of the myelin sheath that surrounds neurons. In one embodiment, the demyelination is a demyelinating myelinoclastic disease in which normal, healthy myelin loses its integrity and/or is destroyed by an insult such as but not limited to a chemical toxin, a viral or bacterial infection or an imbalance in the immune system. In any of the demyelinating myelinoclastic diseases, an inflammatory reaction is present, at least initially, and this inflammation may, in turn become unresolved or enhanced, leading to more widespread demyelination.

In select embodiments, the condition marked by enhanced inflammation in the CNS in which demyelination occurs that may be treated using the methods of the present invention include but is not limited to MS, including clinically isolated syndrome (CIS), relapsing progressive MS, primary progressive MS, secondary progressive MS, tumefactive MS, MS with cavitary lesions, myelocortical MS, Devic's disease, Balo concentric sclerosis, Schilder's diffuse sclerosis, and Marburg MS.

Other conditions marked by enhanced inflammation in the CNS in which demyelination occurs that may be treated using the methods of the present invention include inflammatory demyelinating diseases such as, but not limited to, neuromyelitis optica (NMO), neuromyelitis optica spectrum disorder (NMOSD), autoimmune encephalitis, acute disseminated encephalomyelitis, acute hemorrhagic leukoencephalitis, myelin oligodendrocyte glycoprotein antibody-associated demyelination (Anti-MOG), HTLV-I associated myelopathy (HAM), transverse myelitis, chronic relapsing inflammatory optic neuritis (CRION), and other inflammatory demyelinating diseases as discussed in Höftberger, R. and Lassmann, H., "Inflammatory demyelinating diseases of the central nervous system" in *Handbook of Clinical Neurology*, Kovacs, G. and Alafuzoff, I., Eds., Vol 145, pp. 263-283 (2018), which is incorporated by reference.

Other conditions marked by enhanced inflammation in the CNS that may be treated using the methods of the present invention include, but are not limited to, conditions in which demyelination does not necessarily occur, such as but not limited to radiation-induced damage after cancer therapy, stroke, traumatic brain injury (TBI), viral infection, spinal cord injury, optic nerve injury, and cerebral palsy. Of course, demyelination may occur in any of the conditions listed due to the underlying inflammation in the CNS.

The present invention is also directed to methods of reducing the effects of enhanced inflammation in the CNS of a subject (prophylactic methods). The prophylactic methods comprise administering to a subject in need of treatment for reducing the effects of enhanced inflammation in the CNS an inhibitor of an amino acid transporter in inflammatory cells present in the CNS. In one specific embodiment, the prophylactic methods comprise administering to a subject in need of treatment for reducing the effects of enhanced inflammation in the CNS an inhibitor of an amino acid transporter in microglial cells.

The present invention is additionally directed to methods of reducing inflammation in the CNS of subjects; methods of increasing remyelination of neurons in the CNS of subjects having a condition marked by enhanced inflammation in the CNS; and methods of increasing differentiation of oligodendrocytes into remyelinating oligodendrocytes in the CNS of a subject having a condition marked by enhanced inflammation in the CNS. These methods comprise administering to a subject an inhibitor of an amino acid transporter in inflammatory cells present in the CNS, in accordance with embodiments of the invention.

In additional embodiments, the therapeutic and/or prophylactic methods comprise administering to a subject in need of treatment of enhanced inflammation in the CNS an inhibitor of an amino acid transporter in other types of inflammatory cells present in the CNS, such as, but not limited to, macrophages, T-cells, B-cells, and endothelial cells. These types of macrophages, T-cells, B-cells, and endothelial cells present in the CNS are readily identifiable by those of skill in the art as to their phenotype and function.

In specific embodiments, the compound or composition that is administered to the subject inhibits an amino acid transporter only in microglia cells. In another specific embodiment, the compound or composition that is administered to the subject inhibits an amino acid transporter in microglia as well as at least one other type of inflammatory cells present in the CNS, such as but not limited to macrophages, T-cells, B-cells, and endothelial cells. In another specific embodiment, the compound or composition that is administered to the subject inhibits an amino acid transporter in microglia as well as macrophages present in the CNS. In another specific embodiment, the compound or composition that is administered to the subject inhibits an amino acid transporter in microglia as well as T-cells present in the CNS. In another specific embodiment, the compound or composition that is administered to the subject inhibits an amino acid transporter in microglia as well as B-cells present in the CNS. In another specific embodiment, the compound or composition that is administered to the subject inhibits an amino acid transporter in microglia as well as endothelial cells present in the CNS.

In one embodiment, the therapeutic and/or prophylactic methods of the present invention comprise administering an inhibitor of an amino acid transporter to inflammatory cells present in the CNS, wherein the subject or patient is a mammal. The terms subject and patient are used interchangeably herein. In one specific embodiment, the therapeutic and/or prophylactic methods of the present invention comprise administering an inhibitor of an amino acid transporter to inflammatory cells present in the CNS, wherein the subject or patient is a human, a non-human primate, a mouse, a rat, a dog or a cat. The non-human subjects to which the inhibitor of an amino acid transporter is administered will generally be animals in which inflammation has been induced in animal model studies.

The therapeutic and/or prophylactic methods of the present invention comprise administering an inhibitor of an amino acid transporter to inflammatory cells present in the CNS. In one embodiment, the amino acid transporter that is inhibited is large amino acid transporter small subunit1 (LAT1).

The LAT1 protein is encoded by the Slc7a5 gene and is a sodium-independent, high-affinity transporter of "large" neutral amino acids such as phenylalanine, tyrosine, leucine, arginine, and tryptophan. See UniProt Record Q01650 available on the world-wide web at uniprot.org/uniprot/Q01650, which is incorporated by reference. The LAT1 protein is expressed abundantly in "adult lung, liver, brain, skeletal muscle, placenta, bone marrow, testis, resting lymphocytes and monocytes, and in fetal liver." UniProt Record Q01650. The LAT1 protein is also expressed to a much lesser extent in "thymus, cornea, retina, peripheral leukocytes, spleen, kidney, colon and lymph node." UniProt Record Q01650. LAT1 protein is not expressed in oligodendrocytes and there are currently no known reports or data demonstrating expression of the LAT1 protein in microglia. Moreover, there are no known reports or data demonstrating expression of the LAT1 protein in macrophages, T-cells, or B-cells located in the CNS.

Of course, when the present therapeutic and/or prophylactic methods are practiced on non-human mammals, the methods comprise administering an inhibitor of the ortholog of the human LAT1.

In one embodiment, the inhibitor of the amino acid transporter that is administered to the subject in need of therapy or prophylaxis is JPH203 or a pharmaceutically acceptable salt thereof. The JPH203 compound is (S)-2-Amino-3-(4-((5-amino-2-phenylbenzo[d]oxazol-7-yl) methoxy)-3,5-dichlorophenyl) propanoic acid with a molecular formula of $C_{23}H_{19}C_{12}N_3O_4$. The JPH203 compound can also occur in the form of a hydrochloride salt. In one embodiment, the inhibitor of the amino acid transporter that is administered to the subject in need of therapy is JPH203. In one embodiment, the inhibitor of the amino acid transporter that is administered to the subject in need of therapy is JPH203 salt. In one specific embodiment, the inhibitor of the amino acid transporter that is administered to the subject in need of therapy is JPH203 hydrochloride salt. As used herein the term "JPH203" is understood to mean the compound or its pharmaceutical salt.

The compound or salt thereof used in the therapeutic and/or prophylactic methods of the present invention can be administered systemically or locally to the CNS. In one specific embodiment, JPH203 or its pharmaceutically acceptable salt is administered systemically or locally to the CNS. If the compound or its pharmaceutically acceptable salt thereof is administered systemically, the methods of the present invention comprise administering the compound or its pharmaceutically acceptable salt via a route of administration that includes, but is not limited to, intravenous, oral, intraperitoneal, intramuscular, intradermal, intrathecal, subcutaneous, and nasal. In one specific embodiment, JPH203 or its pharmaceutically acceptable salt is administered systemically, via a route of administration that includes, but is not limited to, intravenous, oral, intraperitoneal, intramuscular, intradermal, intrathecal, subcutaneous, and nasal.

As used herein, "treatment" or "treating" refers to an amelioration of inflammation in the CNS, or at least one detectable symptom thereof. In the alternative, "treatment" or "treating" refers to an amelioration of at least one measurable physical parameter, not necessarily discernible by the patient, that is caused by inflammation in the CNS, such as, but not limited to, demyelination of neurons. In another embodiment, "treatment" or "treating" refers to inhibiting the progression of a disease or disorder, either physically, e.g., stabilization of a discernible symptom, physiologically, e.g., stabilization of a physical parameter, or both.

In certain embodiments, the compositions of the invention are administered to a patient, for example a human, as a preventative measure against the effects of inflammation in the CNS. As used herein, the term "prevent," as it relates to inflammation in the CNS, indicates that the active compound is administered to a subject to at least partially inhibit effects of or to reduce the likelihood that the subject will suffer from the effects inflammation in the CNS. Of course, the term "prevent" also encompasses prohibiting entirely the emergence of any associated symptoms of inflammation of the CNS from detectably appearing.

When the compound(s) is (are) administered to the subject for therapeutic purposes, the subject has already been diagnosed with a condition marked by inflammation in the CNS, e.g., MS. The therapeutic methods are intended to at least slow the progression of inflammation in the CNS or the effects of inflammation in the CNS. The phrase "slow the progression," as it relates to inflammation in the CNS, is used to mean a procedure designed to at least partially inhibit the detectable appearance of one or more symptoms in a patient already exhibiting one or more symptoms of inflammation in the CNS, and is also used to mean at least partially inhibiting the already-present symptoms of inflammation in the CNS from worsening in the subject. Of course the therapeutic methods of the present invention may also be intended to stop or even reverse the progression of inflammation in the CNS or the effects of inflammation in the CNS.

When the compound(s) is (are) administered to the subject for prophylactic purposes, the compound(s) is (are) generally administered prior to the onset of any detectable symptoms of demyelination. Thus a subject may be "pretreated," by administering an inhibitor of an amino acid transporter in pro-inflammatory cells present in the CNS. Accordingly, the present invention also relates to methods of pretreating the effects of enhanced inflammation in the CNS of a subject, the method comprising administering to a subject in need of pretreatment of enhanced inflammation in the CNS an inhibitor of an amino acid transporter in inflammatory cells present in the CNS.

The pretreatment methods of the present invention will generally comprise administration of an inhibitor of an amino acid transporter, e.g., JPH203 or its pharmaceutically acceptable salt, when the subject is not exhibiting any symptoms of inflammation in the CNS. In select embodiments, administration of an inhibitor of an amino acid transporter, e.g., JPH203 or its pharmaceutically acceptable salt, can occur after the subject has suffered from an injury known to induce inflammation in the CNS, i.e., the subject has suffered from an injury known to induce inflammation in the CNS prior to administration of the inhibitor of an amino acid transporter.

In select embodiments of the pretreatment methods, the injury known to induce inflammation in the CNS can be one of radiation-induced damage after cancer therapy, stroke, traumatic brain injury (TBI), viral infection, spinal cord injury, and optic nerve injury.

In select embodiments of the pretreatment methods, the inhibitor of an amino acid transporter, e.g., JPH203 or its pharmaceutically acceptable salt, is administered to the subject within about 7 days of the injury. In more specific embodiments, the inhibitor of an amino acid transporter, e.g., JPH203 or its pharmaceutically acceptable salt, is administered to the subject, within about 6 days of the injury, within about 5 days of the injury, within about 4 days of the injury, within about 3 days of the injury, within about 48 hours of the injury, within about 36 hours of the injury, within about 24 hours of the injury, within about 12 hours of the injury, within about 6 hours of the injury, within about 2 hours of the injury, or within about 1 hour of the injury.

The mechanism of action of JPH203 or its salt is not critical to the treatment and/or pretreatment methods of the present invention. In one specific embodiment, however, JPH203 or its pharmaceutically acceptable salt, when administered to the subject in need of treatment or pretreatment of inflammation in the CNS, selectively inhibits mTOR (mechanistic target of rapamycin) signaling in inflammatory cells present in the CNS. In one specific embodiment JPH203 or its salt, when administered to the subject in need of treatment or pretreatment of inflammation in the CNS, selectively inhibits mTOR signaling in microglia. As one of skill in the art is aware, mTOR is a kinase that is involved in regulating cell cycle, proliferation, and cell survival. The effect of mTOR activation are cell-type specific, but amino acids are necessary for mTOR activation.

In one specific embodiment, therefore, the treatment and/or pretreatment methods of the present invention comprise inhibiting the activity of mTOR kinase in inflammatory cells present in the CNS in a subject in need of treatment of inflammation in the CNS by administering JPH203 or its pharmaceutically acceptable salt to the subject. In more specific embodiments, the methods of the present invention comprise inhibiting the activity of mTOR kinase in microglia in the CNS in a subject in need of treatment of inflammation in the CNS by administering JPH203 or its salt to the subject. In additional specific embodiments, the methods of the present invention comprise inhibiting the activity of mTOR kinase in macrophages, T-cells, B-cells, and/or endothelial cells in the CNS in a subject in need of treatment of inflammation in the CNS by administering JPH203 or its salt to the subject.

Administration of the inhibitor of an amino acid transporter in inflammatory cells in the CNS to subjects in need of treatment or pretreatment may increase or promote differentiation of oligodendrocyte precursor cells (OPCs) (or oligodendrocyte progenitor cells) into remyelinating oligodendrocytes within the CNS of the subject. Oligodendrocyte cells are well-known to one of skill in the art and are cells that are involved in generating myelin covering neuronal axons. The majority of oligodendrocytes are formed during embryogenesis, but in adults OPCs are recruited to a lesion in the CNS and can differentiate into more mature myelin-producing oligodendrocytes.

In instances of chronic inflammation or persistent unresolved inflammation, however, OPCs may fail to differentiate into myelin-producing oligodendrocytes even though they may be recruited to the lesion. Activated microglia or other activated inflammatory cells present in the CNS appear to block the differentiation of OPCs to mature oligodendrocytes. In one specific embodiment, therefore, the methods of the present invention comprise promoting the differentiation of OPCs into remyelinating oligodendrocytes in the CNS in a subject in need of treatment of inflammation in the CNS by administering JPH203 or its pharmaceutically acceptable salt to the subject.

It follows, therefore, that treatment and/or pretreatment methods of the present invention may also comprise promoting the remyelination of neurons in the CNS in a subject in need of treatment or pretreatment of inflammation in the CNS by administering JPH203 or its pharmaceutically acceptable salt to the subject. Measuring or visualizing myelin content in the brain and spinal cord include, but are not limited to, myelin water fraction, magnetisation transfer ratio (MTR), restricted proton fraction f (taken from quantitative MTR), diffusion tensor imaging (DTI) metrics, and positron emission tomography (PET) imaging. These techniques for measuring myelin content, in terms of assessing levels and extent of demyelination and/or remyelination, are well known in the art. See Mallik, S., et al., *J. Neurol. Neurosurg. Psychiatry*, 85:1396-1404 (2014) (doi: 10.1136/jnnp-2014-307650), which is incorporated by reference.

As is well-known in the art, remyelination of neuronal axons will reduce neuronal dystrophy and/or reduce neuronal degeneration. In one specific embodiment, therefore, the treatment and/or pretreatment methods of the present invention comprise reducing neuronal dystrophy and/or reducing neuronal degeneration in the CNS in a subject in need of treatment or pretreatment of inflammation in the CNS by administering JPH203 or its pharmaceutically acceptable salt to the subject.

The present application is also directed to compositions comprising an inhibitor of an amino acid transporter in pro-inflammatory cells, or a pharmaceutically acceptable salt thereof, wherein the composition is formulated for administration into the CNS of a mammal. In one specific embodiment, the inhibitor of an amino acid transporter in pro-inflammatory cells in the CNS is JPH203 or its pharmaceutically acceptable salt. As used herein, the term "compound" is used to mean the active inhibitor of an amino acid transporter, such as JPH203, and its pharmaceutically acceptable salt.

As used herein, the phrase "administration into the CNS" can mean direct, local administration of the active compound into the CNS, or it can also mean a systemic administration of the compound, provided the active compound can cross the blood brain barrier into the CNS. For example, JPH203 and its pharmaceutically acceptable salts can cross the blood brain barrier.

Suitable dosage ranges of the active compounds of the invention, regardless of the route of administration, are generally about 0.0001 milligram to 2000 milligrams of the compound of the invention per kilogram body weight. In one specific embodiment, the dose is about 0.001 milligram to about 1500 milligrams per kilogram body weight, more specifically about 0.01 milligram to about 1000 milligrams per kilogram body weight, more specifically about 0.1 milligram to about 500 milligrams per kilogram body weight, and yet more specifically about 1 milligram to about 100 milligrams per kilogram body weight.

The compounds and the compositions of the invention may also be administered by any route, for example, by infusion or bolus injection, by absorption through epithelial or mucocutaneous linings (e.g., oral mucosa, rectal and intestinal mucosa, etc.), and they may be administered together with another biologically active agent. Administration can be systemic or local. Various delivery systems are known, e.g., encapsulation in liposomes, microparticles, microcapsules, capsules, etc., and can be used to administer a compound or composition of the invention.

In specific embodiments, it may be desirable to administer one or more compounds or compositions of the invention locally to the area in need of treatment. This may be achieved, for example, and not by way of limitation, by local infusion such as an epidural injection; topical application that can be absorbed through the skin or mucosal layers; by injection such as via a catheter; by a suppository; or by implant, with the implant being of a porous, non-porous or gelatinous material, including membranes, such as but not limited to silastic membranes, or fibers.

Pulmonary administration can also be employed, e.g., by use of an inhaler or nebulizer, and formulation with an aerosolizing agent, or via perfusion in a fluorocarbon or synthetic pulmonary surfactant. In certain embodiments, the compounds of the invention can be formulated as a suppository, with traditional binders and vehicles such as triglycerides.

The present compositions will contain a therapeutically effective amount of the inhibitor of an amino acid transporter, such as JHP203 or its pharmaceutically acceptable salt, together with a suitable amount of a pharmaceutically acceptable vehicle so as to provide the form for proper administration to the patient.

The term "pharmaceutically acceptable" means approved by a regulatory agency of the Federal or a state government or listed in the U.S. Pharmacopeia or other generally recognized pharmacopeia for use in animals, and more particularly in humans. The term "vehicle" refers to a diluent, adjuvant, excipient or carrier with which a compound of the invention is administered. Such pharmaceutical vehicles can be liquids, such as water and oils, including those of petroleum, animal, vegetable or synthetic origin, such as peanut oil, soybean oil, mineral oil, sesame oil, and the like. The pharmaceutical vehicles can be saline, gum acacia, gelatin, starch paste, talc, keratin, colloidal silica, urea, and the like. In addition, auxiliary, stabilizing, thickening, lubricating and coloring agents may be used. When administered to a patient, the compounds of the invention and pharmaceutically acceptable vehicles are preferably sterile. Sterile water can be a vehicle when the compound of the invention is administered intravenously. Saline solutions and aqueous dextrose and glycerol solutions can also be employed as liquid vehicles, particularly for injectable solutions. Suitable pharmaceutical vehicles also include excipients such as starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, and the like. The present compositions, if desired, can also contain minor amounts of wetting or emulsifying agents, or pH buffering agents.

The present formulations can take the form of solutions, suspensions, emulsion, tablets, pills, pellets, capsules, capsules containing liquids, powders, sustained-release formulations, suppositories, emulsions, aerosols, sprays, suspensions, or any other form suitable for use.

In another embodiment, the compounds and/or compositions of the invention are formulated in accordance with routine procedures as a pharmaceutical composition adapted for intravenous administration to human beings. Typically, compounds and/or compositions of the invention for intravenous administration are solutions in sterile isotonic aqueous buffer. Where necessary, the compositions may also include a solubilizing agent. Compositions for intravenous administration may optionally include a local anesthetic such as lignocaine to ease pain at the site of the injection. Generally, the ingredients of the formulations of the present invention are supplied either separately or mixed together in unit dosage form, for example, as a dry lyophilized powder or water free concentrate in a hermetically sealed container such as an ampoule or sachette indicating the quantity of active agent. Where the compound of the invention is to be administered by infusion, it can be dispensed, for example, with an infusion bottle containing sterile pharmaceutical grade water or saline. Where the compound of the invention is administered by injection, an ampoule of sterile water for injection or saline can be provided so that the ingredients may be mixed prior to administration.

In one specific embodiment, the compositions of the invention can be administered orally. Formulations for oral delivery may be in the form of tablets, lozenges, aqueous or oily suspensions, granules, powders, emulsions, capsules, syrups, or elixirs, for example. Orally administered compositions may contain one or more optional agents, for example, sweetening agents such as fructose, aspartame or saccharin; flavoring agents such as peppermint, oil of wintergreen, or cherry; coloring agents; and preserving agents, to provide a pharmaceutically palatable preparation. Moreover, where in tablet or pill form, the compositions may be coated to delay disintegration and absorption in the gastrointestinal tract thereby providing a sustained action over an extended period of time. Selectively permeable membranes surrounding an osmotically active driving compound are also suitable for orally administered compounds of the invention. In one particular platform, fluid from the environment surrounding the capsule is imbibed by the driving compound, which swells to displace the agent or agent composition through an aperture. These delivery platforms can provide an essentially zero order delivery profile as opposed to the spiked profiles of immediate release formulations. A time delay material such as glycerol monostearate or glycerol stearate may also be used. Oral compositions can include standard vehicles such as mannitol, lactose, starch, magnesium stearate, sodium saccharine, cellulose, magnesium carbonate, etc.

The amount of a compound of the invention that will be effective in the treatment of inflammation in the CNS will depend on the nature or extent of the inflammation, and can be determined by standard clinical techniques. In addition, in vitro or in vivo assays may be employed to identify optimal dosage ranges. The precise dose to be employed in the formulations of the present invention will also depend on the route of administration and the extent of the condition, and dosing should be decided according to the judgment of the practitioner and each patient's circumstances. In specific embodiments of the invention, the oral dose of at least the inhibitor of an amino acid transported in pro-inflammatory cells in the CNS is about 0.01 milligram to about 100 milligrams per kilogram body weight, or from about 0.1 milligram to about 50 milligrams per kilogram body weight, or from about 0.5 milligram to about 20 milligrams per kilogram body weight, or from about 1 milligram to about 10 milligrams per kilogram body weight.

Suitable dosage ranges of the active compound for parenteral, for example, intravenous administration can be 0.01 milligram to 100 milligrams per kilogram body weight, 0.1 milligram to 35 milligrams per kilogram body weight, and 1 milligram to 10 milligrams per kilogram body weight. Suitable dosage ranges of the active compound for intranasal administration are generally about 0.01 pg/kg body weight to 1 mg/kg body weight. Suppositories generally contain 0.01 milligram to 50 milligrams of the active compound of the invention per kilogram body weight. Suitable doses of the active compound for topical administration are in the range of 0.001 milligram to 1 milligram, depending on the area to which the compound is administered. Effective doses may be extrapolated from dose-response curves derived from in vitro or animal model test systems. Such animal models and systems are well known in the art.

The invention also provides pharmaceutical packs or kits comprising one or more containers filled with the active compound of the invention. Optionally associated with such container(s) can be a notice in the form prescribed by a governmental agency regulating the manufacture, use or sale of pharmaceuticals or biological products, which notice reflects approval by the agency of manufacture, use or sale for human administration.

EXAMPLES

Example 1—Expression of mRNA Encoding LAT1

Focal demyelination was induced by injecting 1% lysolecithin (Sigma-Aldrich) into the spinal cord ventral *funiculus* of 8-12 weeks old C57B1/6 mice of either sex. At 5 and 10 days post lesion (dpl), mice were perfused intracardially with 4% (w/v) paraformaldehyde (PFA; Sigma).

To determine expression of Slc7a5 mRNA in the lesioned and non-lesioned spinal cord sections, fluorescent in situ hybridization (RNAscope) was used to detect slc7a5 mRNA labeled by a specific probe designed to target a sequence of GenBank Accession Number NM 011404.3 (Advanced Cell Diagnostics, ACD, Hayward, CA). RNAscope Multiplex Fluorescent Assay on fixed frozen tissue sections was performed according to manufacturer's instructions (Advanced Cell Diagnostics, ACD, Hayward, CA). Briefly, the slides containing 12.5 μm-thick coronal sections of the lesioned spinal cords (collected at 5 and 10 dpl) were submerged into boiling 1×target retrieval buffer (ACD) for 5-10 min, followed by protease III treatment (ACD) for 30 min at 40° C. Following ACD protocol for hybridization and signal amplification steps, slides were subjected to a subsequent immunohistochemistry (IHC) with T-cell (CD-3) and microglia/macrophage (CX3CR1-GFP)—specific markers. Images were acquired using Zeiss LSM 880 confocal microscope. mRNA puncta were quantified using Imaris software (Bitplane, Oxford Instruments).

To perform IHC, mice were perfusion-fixed with 4% PFA (Sigma). Spinal cords were dissected and postfixed for 30 min in 4% PFA at 4° C. and cryoprotected in 20% (w/v) sucrose (Sigma) in PBS overnight before freezing in O.C.T. on the surface of dry ice. Twelve-micrometer-thick spinal cord sections were cut using cryostat (Leica CM1900), collected on SuperFrostPlus slides (VWR International), and allowed to dry for 30 min before storing at −80° C. For IHC, sections were incubated in blocking solution (0.1% Triton™ X-100 and 10% FBS in PBS) for 1 h at room temperature (RT). Primary antibodies were diluted in blocking solution and applied overnight at 4° C. Fluorescent dye-conjugated secondary antibodies were obtained from Life Technologies and used according to the manufacturer's instruction.

FIG. 1 shows the results of the analysis. FIG. 1A shows quantification of Slc7a5 mRNA, showing increased density in lesions at 5 and 10dpl, compared to contralateral non-lesioned white matter (n=2). FIGS. 1B and 1C show co-immunostaining with Slc7a5 transcripts at 5dpl shows Slc7a5 detection in (1B) CD-3+ T-cells and (1C) Cx3cr1-GFP+microglia/macrophages within the CNS lesion. FIG. 1D shows very few Slc7a5 puncta being detected in resting microglia in the adjacent non-lesioned tissue. Scale bar, 10 μm.

Example 2—Analysis of JPH203 Administration in Experimental Animal Models

C57BL/6 female mice (Charles River) at age 10-12 weeks were acclimatized for 7 days prior to inducing experimental autoimmune encephalomyelitis (EAE). EAE was induced using the EAE kit (Hooke Laboratories, Cat. No: EK-2110) according to the Hooke Laboratories protocol (on the world wide web at hookelabs.com/protocols/eaeAI_C57BL6.html). Briefly, mice were immunized by an emulsion of MOG35-55 in complete Freund's adjuvant (CFA) injected subcutaneously at two sites (Day 0), followed by administration of pertussis toxin (PTX) intraperitoneally, first on the day of immunization (Day 0), and then again the following day (Day 1). Approximately 115 ng of PTX for each of the two PTX administrations were used.

The mice were scored blindly and daily from EAE Day 7 until at least EAE Day 30 according to the protocol from Hooke Laboratories. The scoring system used was as follows: 0.0=no obvious changes in motor function; 0.5=tip of tail is limp; 1.0=limp tail; 1.5=limp tail and hind leg inhibition; 2.0=limp tail and weakness of hind legs or signs of head tilting; 2.5=limp tail and dragging of hind legs or strong head tilting; 3.0=limp tail and complete paralysis of hind legs or limp tail with paralysis of one front and one hind leg; 3.5=limp tail and complete paralysis of hind legs plus mouse unable to right itself when placed on its side; 4.0=limp tail, complete hind leg and partial front leg paralysis, mouse is minimally moving but appears alert and feeding; 4.5=complete hind and partial front leg paralysis, no movement around the cage, mouse is not alert; 5.0=mouse is found dead due to paralysis or mouse is euthanized due to severe paralysis The clinical scores and weight of mice were recorded daily until the end of experiment. Mice that had spontaneously recovered from EAE, or did not reach a score of 3.0 were not considered in the analysis of the therapeutic study. For each experiment, 8 to 10 mice from each group were analyzed.

Figure 2:
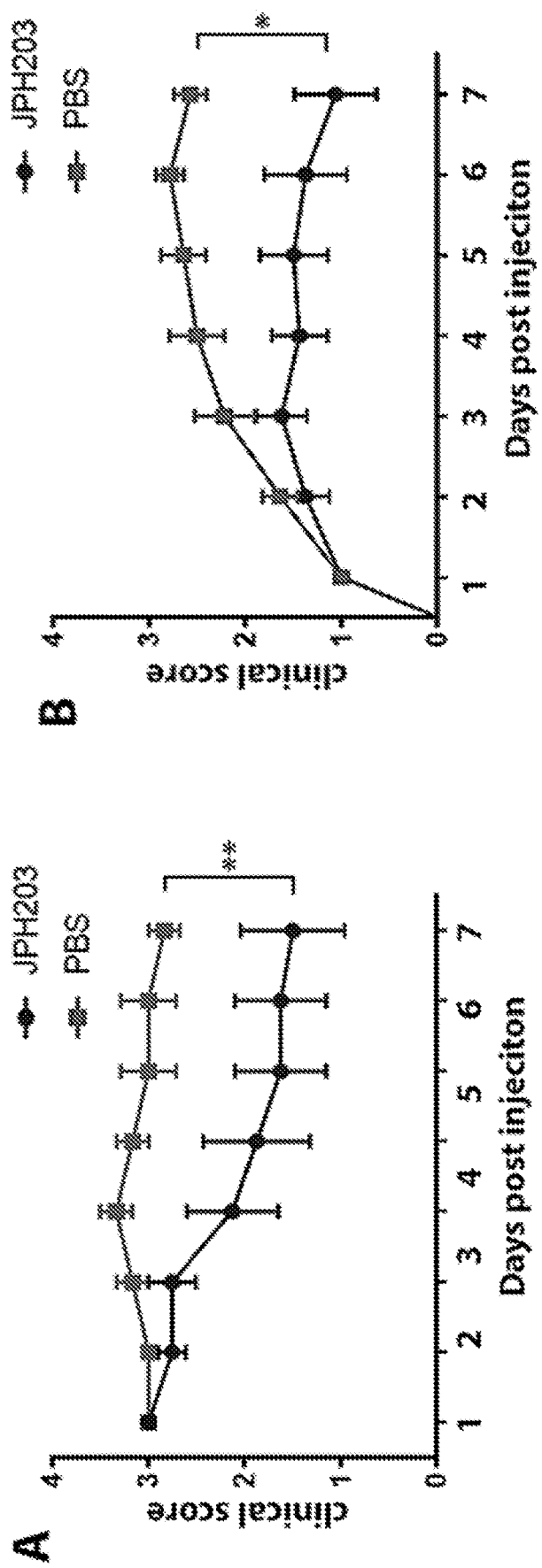
FIG. 2 depicts the administration of JPH203 for 5 consecutives days, via intraperitoneal injections into mice with induced experimental autoimmune encephalomyelitis (EAE).

EAE mice were treated with L-type amino acid transporter 1 (LAT1) inhibitor JPH203 dihydrochloride starting at scores 1.0 and 3.0. See FIG. 2. JPH203 dihydrochloride, dissolved in PBS was administered daily for 5 days via intraperitoneal injections at a dose of 25 mg/kg, injection volume 200 ul/animal. The control group was treated with the same volume of 1 X PBS. Clinical scores of the animals from each group were recorded at 1-7 days after the first injection.

The treatment efficacy of JPH203 was tested in mice starting at clinical score 3.0 (FIG. 2A). The prophylactic efficacy was tested in mice starting at clinical score 1.0 (FIG. 2B). At both scores administration of JPH203 resulted in motor recovery compared to PBS control (n=6 per group). Moreover, JPH203 prophylactic treatment, starting at score 1.0 prevented progression of EAE to higher scores compared to PBS controls that progressed to score 3.0 or higher (FIG. 2B).

Example 3—Pharmacological Effects of JPH203 in CNS Lesions

Focal demyelination was induced by injecting 1% lysolecithin, JPH203 or PBS control was injected via intraperitoneal from 5-9 dpl. Mice were sacrificed at 10 dpl by intracardial perfusion with 4% PFA (Sigma). IHC was performed as previously described. Twelve-micrometer-thick fixed spinal cord sections were cut using cryostat (Leica CM1900), collected on SuperFrostPlus slides (VWR International), and allowed to dry for 30 min before storing at −80° C. For IHC, sections were incubated in blocking solution (0.1% Triton™ X-100 and 10% FBS in PBS) for 1 h at room temperature (RT). Primary antibodies were diluted in blocking solution and applied overnight at 4° C. Sources and dilutions of primary antibodies were as follows: rabbit anti-Olig2 (1:300; Millipore), mouse anti-CC1 (1:200; Sigma). Fluorescent dye-conjugated secondary antibodies were obtained from Life Technologies and used according to the manufacturer's instruction.

Antigen retrieval was used for Olig2 and mouse on mouse antigen retrieval with M.O.M.™ kit (Vector Laboratories) for CC1. DAPI nuclear counterstain was used before mounting sections with fluoromount-G (Southern-Biotech). ImageJ (NIH) was used to quantify Olig2+ CC1+ cells.

Figure 3:
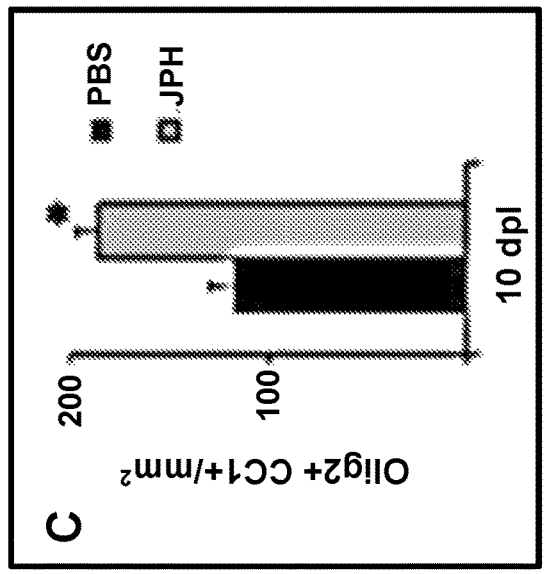
FIG. 3 depicts the pharmacological inhibition of Slc7a5 with JPH203 in CNS lesions.
Figure 3:
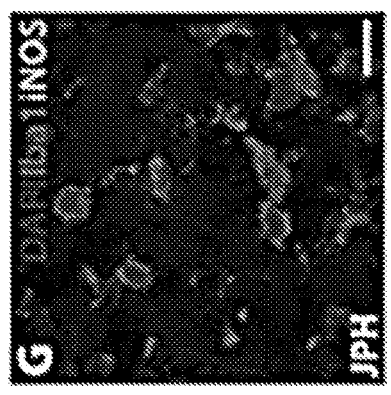
Figure 3:
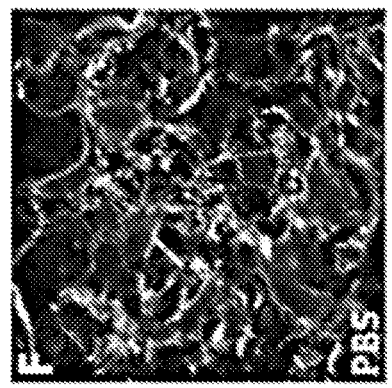
Figure 3:
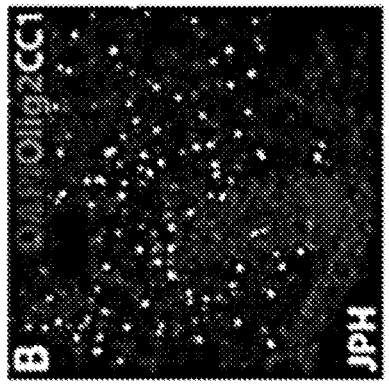
Figure 3:
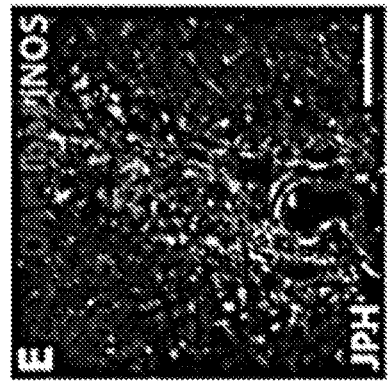
Figure 3:
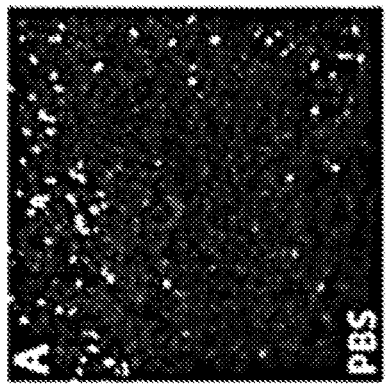
Figure 3:
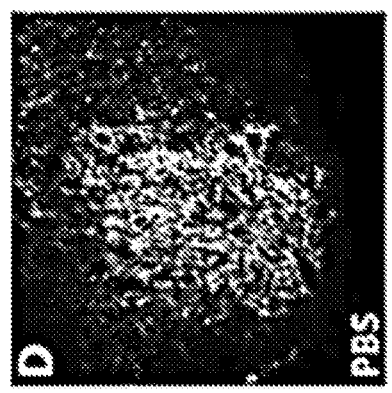

FIG. 3 shows that, compared to PBS control (3A), JPH203 injection resulted in increased number of mature oligodendrocytes in lesions (3B). FIG. 3C also shows the quantification of a 2-fold increase in oligodendrocytes and FIG. 3D shows PBS treated lesion containing high numbers of activated Iba1+iNOS+ microglia/macrophages. FIG. 3E shows a JPH203 treated lesion showing dramatically reduced pro-inflammatory iNOS expression. At higher magnification, (3F) iNOS+ macrophages exhibited rounded amoeboid/foamy appearance in a control lesion, whereas macrophages in a JPH203 treated lesion (3G) display very little iNOS labeling, and exhibited more ramified appearance, indicating reduced inflammatory activity (n=3 per treatment group). * $P<0.05$ Example 4—

To characterize the effect of Slc7a5 inhibition on inflammation and remyelination, systemic administration of JPH203 before demyelination (prophylactic approach) vs. after demyelination (therapeutic approach) is performed. Moreover, since Slc7a5 is not expressed in oligodendrocyte lineage cells, this approach can determine if JPH203 promotes remyelination by selectively targeting microglia/macrophages in CNS lesions without affecting oligodendrocyte lineage cells. For prophylactic treatment, JPH203 (Group 1) or vehicle (Group 2) will be delivered into wildtype mice by intraperitoneal injection for 2 consecutive days before lysolecithin-induced demyelination, and 3 consecutive days after demyelination before sacrificed at 10dpl. For therapeutic treatment, JPH203 (Group 3), or vehicle (Group 4) will be delivered by intraperitoneal injection from 5 to 9dpl after demyelination, and sacrificed at 10dpl. The 10dpl time point is chosen to determine if JPH203 accelerates oligodendrocyte differentiation. Mice will also receive neutral red (NR) injection 2 hours before sacrifice for lesion identification and analysis.

What is claimed is:

1. A method of promoting remyelination of neurons in the central nervous system (CNS) in a condition marked by enhanced inflammation in the CNS and demyelination of neurons of a subject, the method comprising administering to the subject an inhibitor of large amino acid transporter small subunit 1 (LAT1) protein, wherein the inhibitor inhibits LAT1 protein in microglia, macrophages, B-cells, or a combination thereof, present in the CNS.

2. The method of claim 1, wherein the condition is selected from the group consisting of multiple sclerosis (MS), inflammatory demyelinating disease, stroke, acute disseminated encephalomyelitis (ADEM), traumatic brain injury (TBI), viral infection, spinal cord injury, optic nerve injury, and cerebral palsy.

3. The method of claim 1, wherein condition is MS.

4. The method of claim 1, wherein the condition is autoimmune encephalitis.

5. The method of claim 1, wherein the inhibitor inhibits LAT1 protein in microglia, macrophages, or a combination thereof.

6. The method of claim 5, wherein the inhibitor inhibits LAT1 protein in microglia.

7. The method of claim 1, wherein the inhibitor is JPH203 or a pharmaceutically acceptable salt thereof.

8. The method of any of claim 1-6 or 7, wherein the inhibitor is administered systemically.

9. The method of claim 8, wherein the route of systemic administration is selected from the group consisting of intravenously, orally, intraperitoneally, intramuscularly, intradermally, intrathecally, subcutaneously and nasally.

10. The method of any of claim 1-6 or 7, wherein the inhibitor of the amino acid transporter is administered locally to the CNS.

11. The method of any of claim 1-6 or 7, wherein the subject is a mammal.

12. The method of any of claim 1-6 or 7, wherein the inhibitor of an amino acid transporter is administered more than once.

* * * * *